(12) United States Patent
Kobayashi

(10) Patent No.: US 7,424,627 B2
(45) Date of Patent: Sep. 9, 2008

(54) STORAGE DEVICE PROTECTION SYSTEM, METHOD FOR PROTECTING HARD DISK THEREOF, MEDIUM FOR PROVIDING CONTROL PROGRAM, AND CONTROL PROGRAM

(75) Inventor: Noriyuki Kobayashi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 793 days.

(21) Appl. No.: 10/849,359

(22) Filed: May 18, 2004

(65) Prior Publication Data
US 2004/0246855 A1 Dec. 9, 2004

(30) Foreign Application Priority Data
May 22, 2003 (JP) .............................. 2003-144933

(51) Int. Cl.
*H01H 7/00* (2006.01)
*G06F 1/24* (2006.01)

(52) U.S. Cl. ....................... 713/300; 711/111; 711/112; 711/113; 711/114; 713/340

(58) Field of Classification Search ................. 713/300, 713/340; 711/110–114
See application file for complete search history.

(56) References Cited

U.S. PATENT DOCUMENTS

| 5,198,942 | A | * | 3/1993 | Iizuka et al. | ............. 360/78.04 |
| 5,574,920 | A | * | 11/1996 | Parry | ........................... 713/340 |
| 5,598,567 | A | | 1/1997 | Ninomiya | |
| 5,684,998 | A | * | 11/1997 | Enoki et al. | .................. 713/310 |
| 5,710,959 | A | * | 1/1998 | Hirooka et al. | ............... 399/88 |
| 6,192,206 | B1 | * | 2/2001 | Peters et al. | ..................... 399/77 |
| 6,538,344 | B1 | * | 3/2003 | Yang et al. | ..................... 307/66 |
| 6,765,746 | B2 | * | 7/2004 | Kusumoto | .................... 360/75 |
| 7,051,216 | B2 | * | 5/2006 | Suzuki et al. | ................ 713/300 |
| 7,088,017 | B2 | * | 8/2006 | Motegi | ....................... 307/140 |

FOREIGN PATENT DOCUMENTS

| JP | 02-040164 | | 2/1990 |
| JP | 04-172547 | | 6/1992 |
| JP | 5-94237 | A | 4/1993 |
| JP | 5-314631 | A | 11/1993 |
| JP | 7-153172 | A | 6/1995 |
| JP | 2003-76497 | | 3/2003 |

* cited by examiner

Primary Examiner—Abdelmoniem Elamin
(74) Attorney, Agent, or Firm—Canon USA Inc IP Div

(57) ABSTRACT

A storage device protection system has a disk for storing data, the disk including a disk medium and a buffer for writing data to the disk medium. The device includes: a detecting unit for detecting an operation to cut off a main power supply of the device; an access suspending unit for suspending access to the hard disk when the detecting unit detects the operation; a writing unit for writing data in the buffer to the disk medium when the detecting unit detects the operation; and a power cutoff unit for cutting off the main power supply after the writing operation of the medium writing unit.

12 Claims, 9 Drawing Sheets

STORAGE DEVICE PROTECTION SYSTEM, METHOD FOR PROTECTING HARD DISK THEREOF, MEDIUM FOR PROVIDING CONTROL PROGRAM, AND CONTROL PROGRAM

BACKGROUND OF THE INVENTION

1. Field of the Invention

The present invention relates generally to electronic multifunction devices with storage devices and more specifically to protection of storage devices from power supply cut offs.

2. Description of the Related Art

It is well known that when power supply is cut off during data writing to a hard disk medium, the sector to which the data is being written becomes damaged, thus affecting start-up of the system at the next power on. Therefore, most conventional multifunction or computer devices include a means for protecting the hard disk medium when power supply is cut off during the writing of data thereto. An example of a disk protection device is an auxiliary power supply and backup means disclosed in Japanese Patent Laid-Open No. 5-94237.

Another example of a disk protection device is disclosed in Japanese Patent Laid-Open No. 5-314631, which discloses a power supply connecting/disconnecting device for a magnetic disk drive unit. After a power cut off, this power supply device continues to retain power supply to the magnetic disk drive when it is determined that power cutoff will adversely affect recording and playback processes on the magnetic disk drive. The power supply device can be disadvantageous in that although the user can use a power switch to cut off power supply, the user must wait for an undetermined amount of time before power shut down actually occurs.

A further example of a disk protection device is disclosed in Japanese Patent Laid-Open No. 7-153172, which discloses a hard disk protective device for suspending access to the hard disk when instantaneous cutoff of power supply is detected.

Among others, one disadvantage of the above-mentioned conventional hard disk protection systems is that they are somewhat expensive particularly in light of the ever-increasing need for large amounts of data storage by today's data systems. Also, if back up of large amounts of data is required, system performance may be unduly compromised.

SUMMARY OF THE INVENTION

In one aspect, the present invention provides an electronic device having an inexpensive hard disk protection unit for protecting a storage device, the unit being capable of preventing sector failure caused by power supply shut off during storage device access.

To accomplish the above advantage, the present invention provides a storage device protection system having a disk for storing data, the disk including a disk medium and a buffer for writing data to the disk medium, the storage device protection system including: a detecting unit for detecting an operation to cut off a main power supply of the storage device protection system; an access suspending unit for suspending access to the hard disk when the detecting unit detects the operation; a writing unit for writing data in the buffer to the disk medium when the detecting unit detects the operation; and a power cutoff unit for cutting off the main power supply after the writing operation of the writing unit.

The present invention further provides a processing device having a disk for storing data, the device including: a detecting unit for detecting an operation to cut off a main power supply of the device; and a power cutoff unit for cutting off the main power supply after a predetermined time elapsed after the detecting unit detects the operation.

The present invention further provides a disk protecting method for a processing device having a disk for storing data, the disk having a disk medium and a buffer for writing data to the disk medium, the method including the steps of: detecting an operation to cut off a main power supply of the device; suspending access to the disk when the operation is detected in the detecting step; writing data in the buffer to the disk medium when the operation is detected in the detecting step; and cutting off the main power supply after the data is written in the writing step.

The present invention further provides a hard disk protecting method for a processing device having a disk for storing data, the method including a step of cutting off a main power supply after a predetermined time elapsed after an operation to cut off the main power supply of the device is performed.

The present invention further provides a control program for executing a disk protecting method for a processing device having a disk for storing data, the disk including a disk medium and a buffer for writing data to the disk medium, the program including the steps of: detecting an operation to cut off a main power supply of the device; suspending access to the disk when the operation is detected in the detecting step; writing data in the buffer to the disk medium when the operation is detected in the detecting step; and cutting off the main power supply after the data is written in the writing step.

The present invention further provides a control program for executing a disk protecting method for an image processing device having a disk for storing data, the program including a step of cutting off a main power supply after a predetermined time elapsed after an operation to cut off the main power supply of the device is performed.

The present invention further discloses a system for providing storage devices with protection from power supply cut off. Each storage device includes a disk medium and a buffer for writing data to the disk medium. The system includes a number of features such as a detecting unit for detecting a user action to cut off power supply to a storage device, and an access suspending unit for suspending data access to the storage device upon detection of the user action by the detecting unit. Note that the duration of suspension of data access to the storage device is until all data in the buffer has been written to the disk medium. The system further includes an indicator for indicating whether the user action is permitted by the user upon detection of the user action. It is also notable that the detecting unit detects the user action to cut off the power supply before the power supply is actually cut off by the user.

As mentioned above, each embodiment of the present invention can provide a low-cost hard disk protection unit capable of preventing device start up problems caused by disk sector failure, and this low-cost hard disk protection unit is provided with reliability and without deterioration in performance.

Further, features and advantages of the present invention will become apparent from the following description of the preferred embodiments with reference to the attached drawings.

DETAILED DESCRIPTION OF THE INVENTION

Embodiments of the present invention will now be described hereinbelow with reference to the drawings.

First Embodiment

System Structure

Figure 1:
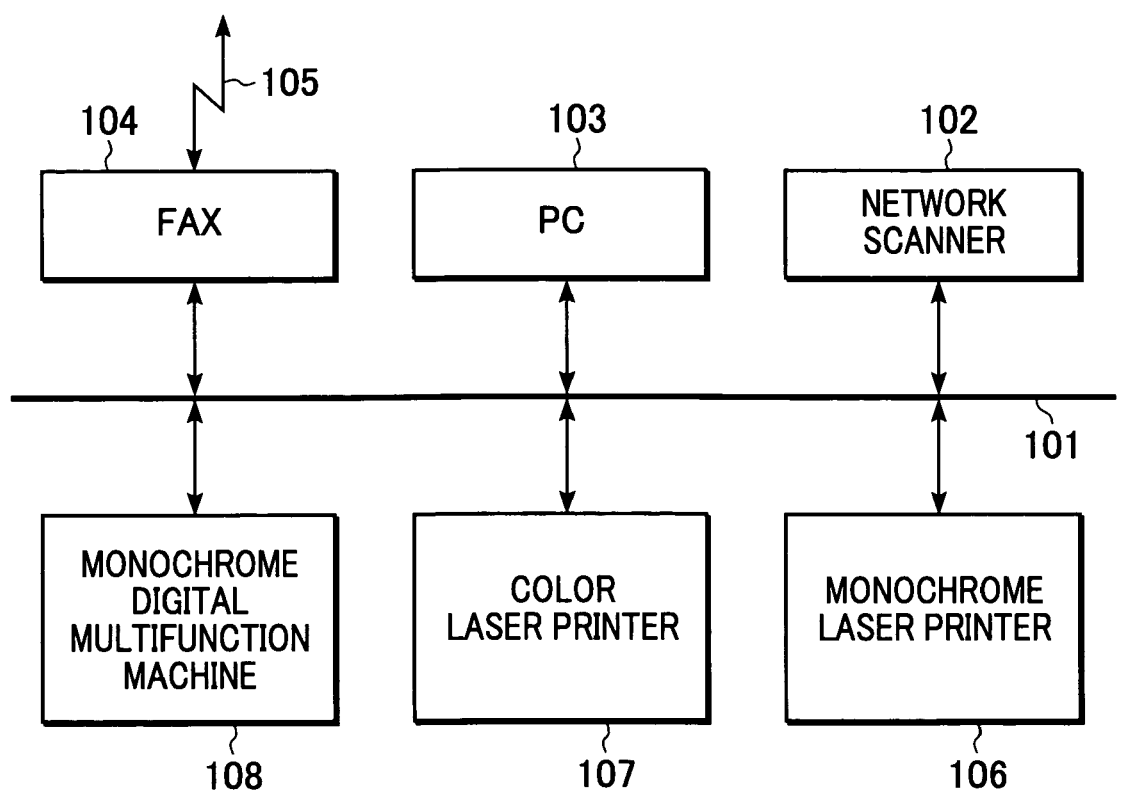
FIG. 1 is a block diagram of a system including a multifunction device according to a first embodiment of the present invention.

FIG. 1 is a block diagram of the structure of a system including a multifunction device according to a first embodiment of the present invention.

In FIG. 1, all devices are communicably coupled via a network 101 such as an Ethernet network, for example.

A network scanner 102 optically reads a document printed on paper and includes a network interface. The network scanner 102 reads image data in three colors (RGB).

Network printers 106, 107, and 108 each include a network interface. Each network printer receives print data and image data supplied through the network interface and prints the data on a medium such as a sheet of paper using a known printing technique such as electrophotography. The network printers 106 to 108 are connected to the other devices via the network 101. The network printer 106 is a monochrome laser printer, the network printer 107 is a color laser printer, and the network printer 108 is a monochrome digital multifunction machine (image input/output device) serving as a multifunction device according to the present embodiment.

A facsimile (FAX) 104, i.e., a facsimile machine, includes a network interface and transmits and receives image data through a public circuit 105. The FAX 104 also functions as an interface for transmitting image data read through the network scanner 102 in the network 101, allowing the printer 108, 107, or 106 to print the received image data, or receiving or transmitting image data which is saved in a file in a personal computer (PC) 103 through the public circuit 105.

Functional Structure of Multifunction Device

Figure 2:
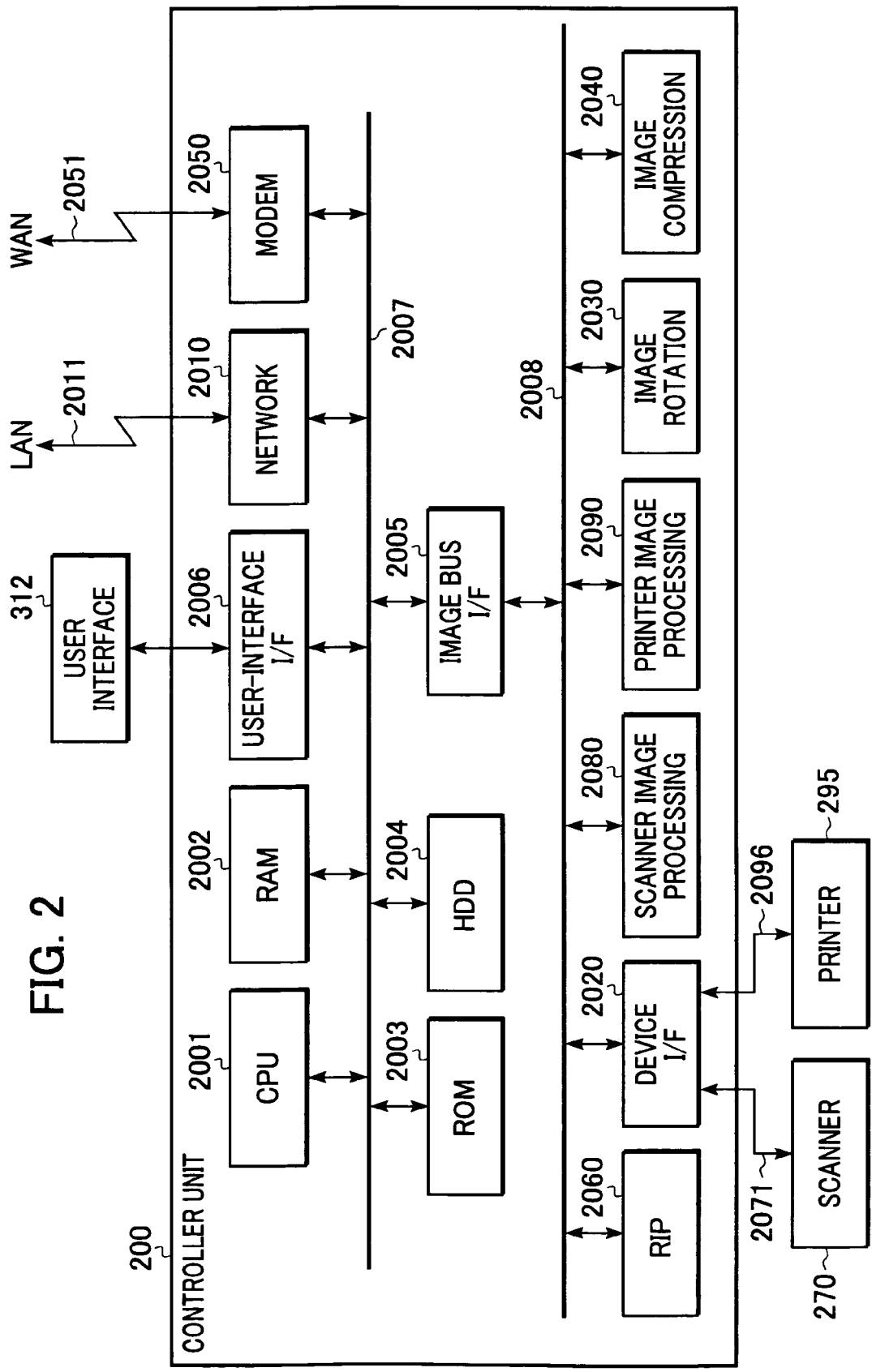
FIG. 2 is a block diagram of the functional structure of the multifunction device shown in FIG. 1.

FIG. 2 is a block diagram of the functional structure of the multifunction device 108 in FIG. 1.

A controller unit 200 is connected to a scanner 270 serving as an image input/output device, a printer 295 serving as an image output device, a LAN 2011, and a public circuit (WAN) 2051. The controller unit 200 controls input and output of image information and device information.

A CPU 2001 functions as a controller for controlling the entire system. A RAM 2002 serves as a memory for the operation of the CPU 2001 and temporarily stores image data.

A ROM 2003 functions as a boot ROM and stores a boot program for the system. An HDD 2004 includes a hard disk medium, a buffer for writing data to the hard disk medium, a hard disk drive, and an IDE controller. The HDD 2004 stores system software, image data, and management information used to manage the image data.

A user-interface I/F 2006 links the system with a user interface (UI) 312, and generates image data to the UI 312 to display information in the UI 312. Further, the user-interface I/F 2006 transmits information, entered by the user of the present system through the UI 312, to the CPU 2001. A network 2010 connects to the LAN 2011 to transmit and receive information. A modem 2050 connects to the WAN 2051 to transmit and receive information. The above-mentioned devices are connected through a system bus 2007.

An image bus I/F 2005 serves as a bus bridge for connecting the system bus 2007 to an image bus 2008, through which image data is transferred at high speed, and for converting a data structure. The image bus 2008 can be a PCI bus or IEEE1394. The following devices are connected through the image bus 2008.

A raster image processor (RIP) 2060 develops PDL codes into bitmapped images. A device I/F 2020 connects the controller unit 200 to the scanner 270 and the printer 295 and converts data between synchronous and asynchronous image data. A scanner image processing unit 2080 corrects, processes, and edits input image data. A printer image processing unit 2090 calibrates the printer and/or changes resolution with respect to image data to be printed. An image rotation unit 2030 rotates image data. An image compression unit 2040 compresses or expands multilevel image data using JPEG and also compresses or expands binary image data using JBIG, MMR, or MH.

External View of Multifunction Device

Figure 3:
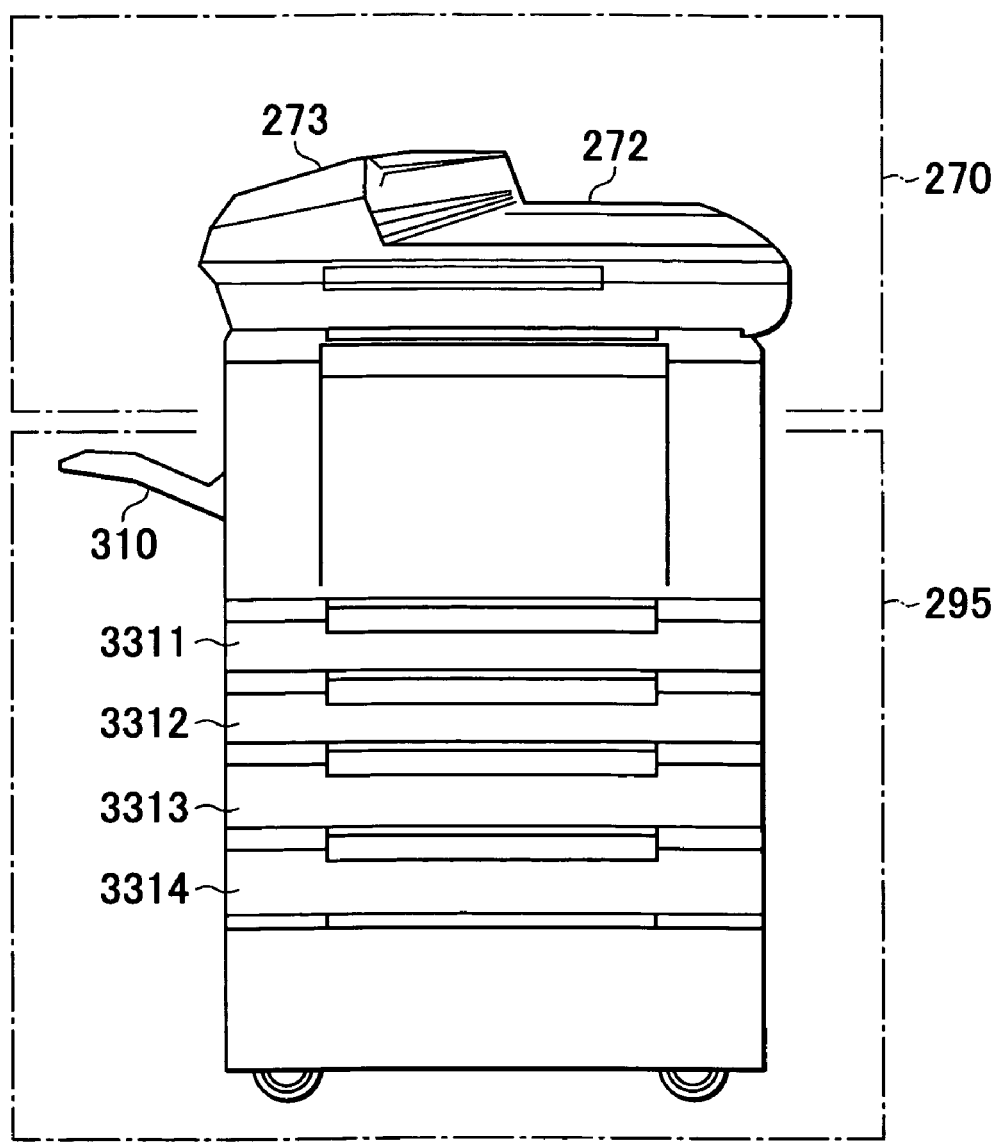
FIG. 3 is an external view of the multifunction device in FIG. 1.

FIG. 3 is an external view of the multifunction device 108 shown in FIG. 1.

In the scanner 270 of the present multifunction device, an image of a document on a sheet is illuminated and is scanned through a CCD line sensor (not shown), so that the image is converted into electric signals as raster image data. Document sheets are set on a tray 273 of a document feeder 272. When the user initiates operation via the UI 312, the CPU 2001 generates an instruction (2071 in FIG. 2) to the scanner 270, and the document feeder 272 begins to feed the document sheets one by one to read images on the document sheets.

The printer 295 converts the raster image data into an image to be printed on a sheet. The printer 295 prints an image using any printing method such as electrophotography with a photosensitive drum or belt, or inkjet printing whereby inks are sprayed from a microfabricated nozzle array to directly form an image on a sheet.

The printing operation is started by an instruction 2096 generated from the CPU 2001. The printer 295 has a plurality of paper feeders so that different paper sizes or different page orientations can be set. The printer 295 includes paper cassettes 3311, 3312, 3313, 3314 corresponding to the respective feeders. An output tray 310 receives printed output sheets.

User Interface

Figure 4:
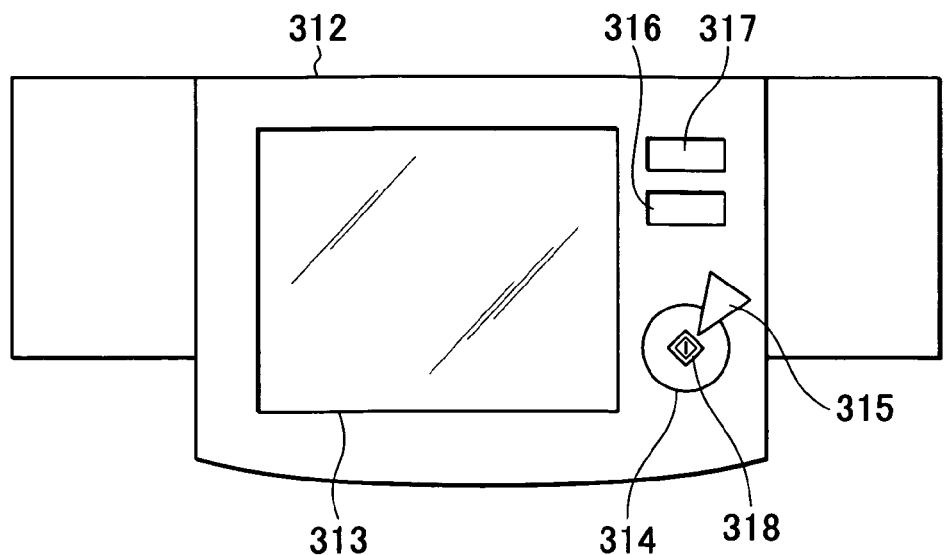
FIG. 4 is an external view of a user interface of the multifunction device of FIG. 2.

FIG. 4 is an external view of the UI 312 of the multifunction device 108 shown in FIG. 2.

A touch panel is attached onto an LCD 313 to display an operation screen of the system. When the user presses any one of displayed keys, the LCD 313 transmits the position information of the key to the CPU 2001. A start key 314 is used to start the operation to provide document images. Two LEDs (green and red) 318 are arranged in the center of the start key 314. The color of the LED 318 indicates whether the start key 314 is available. A stop key 315 is used to cancel the on going operation. An ID key 316 is used to enter the ID of the user. A reset key 317 is used to initialize setting entered through the UI 312.

Power Supply Control System

Figure 5:
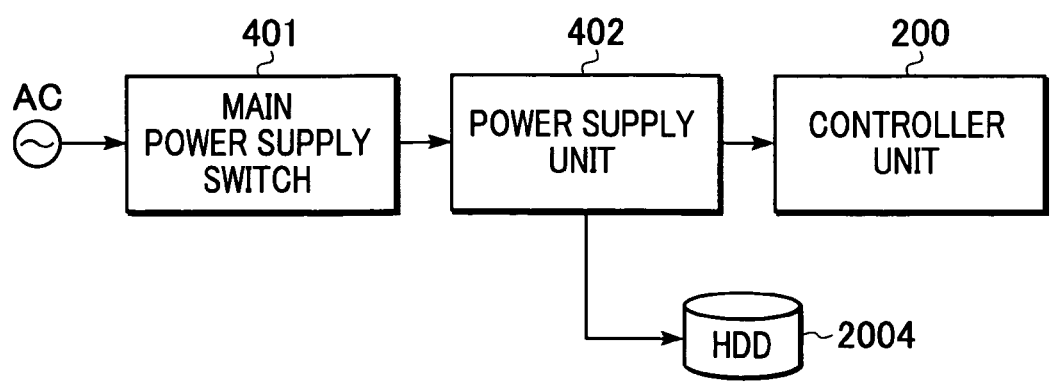
FIG. 5 is a block diagram of a power supply control system of the multifunction device in FIG. 1.

FIG. 5 is a block diagram of a power supply control system of the multifunction device shown in FIG. 1.

Referring to FIG. 5, a main power supply switch 401 and a power supply unit 402 are arranged.

The power supply unit 402 supplies power to the controller unit 200 and the HDD 2004 and converts alternating current (AC), supplied through the main power supply switch 401, into direct current (DC).

Hard Disk Protecting Means

Among others, one characteristic of the present embodiment is to provide a means for protecting a hard disk medium when power supply is cut off during data writing to the hard disk medium. The hard disk protecting means will now be described hereinbelow.

Figure 6A:
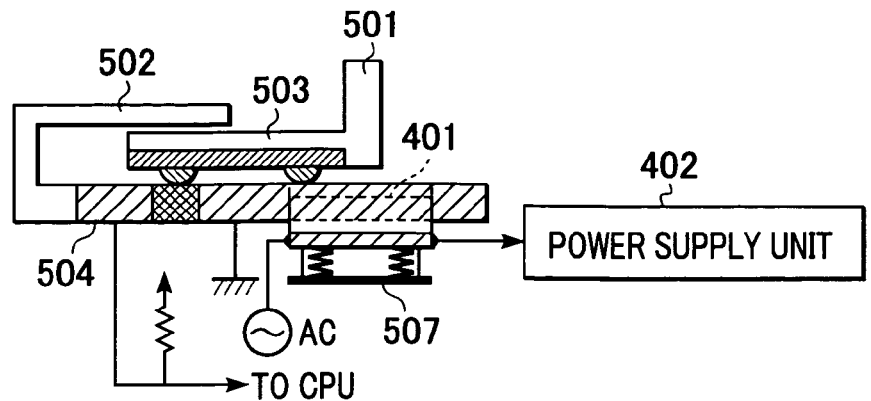
FIGS. 6A to 6C are diagrams showing the structure of the hard disk protecting means according to the first embodiment.

FIG. 6A illustrates the configuration of the hard disk medium protection means. Hard disk protection is initiated when power shut off by the user is detected. The hard disk medium protection means includes a cover 501 for the main power supply, a cover holder 502, the button-type main power supply switch 401 including LEDs, and a spring controller 507 for mechanically controlling the position of the main power supply switch 401.

Figure 6B:
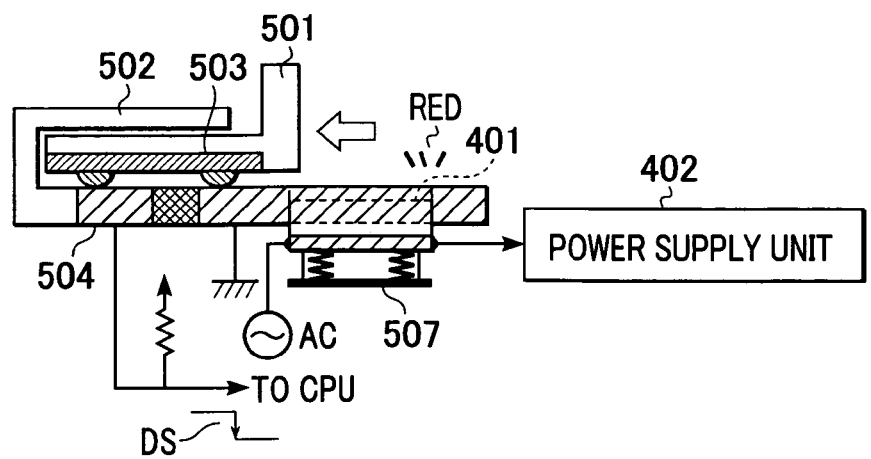
Figure 6C:
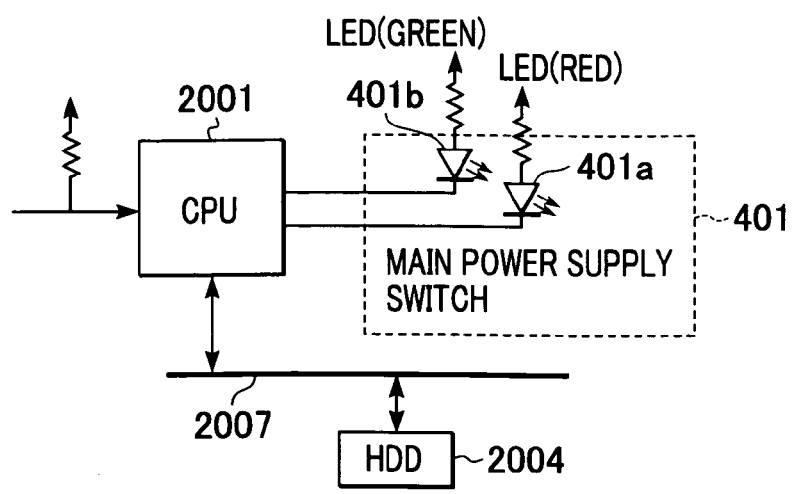

Referring to FIG. 6B, operation is initiated when the user slides the main power supply cover 501, which causes a contact 503 on the cover 501 to contact another contact 504 on the cover holder 502. At this time, the contact 504 goes to ground (GND) level. Information indication the cover 501 has been slid is generated as a detection signal DS so that an interrupt to the CPU 2001 occurs. FIG. 6C shows the connection between the CPU 2001 and the HDD 2004 and the periphery thereof.

Figure 7A:
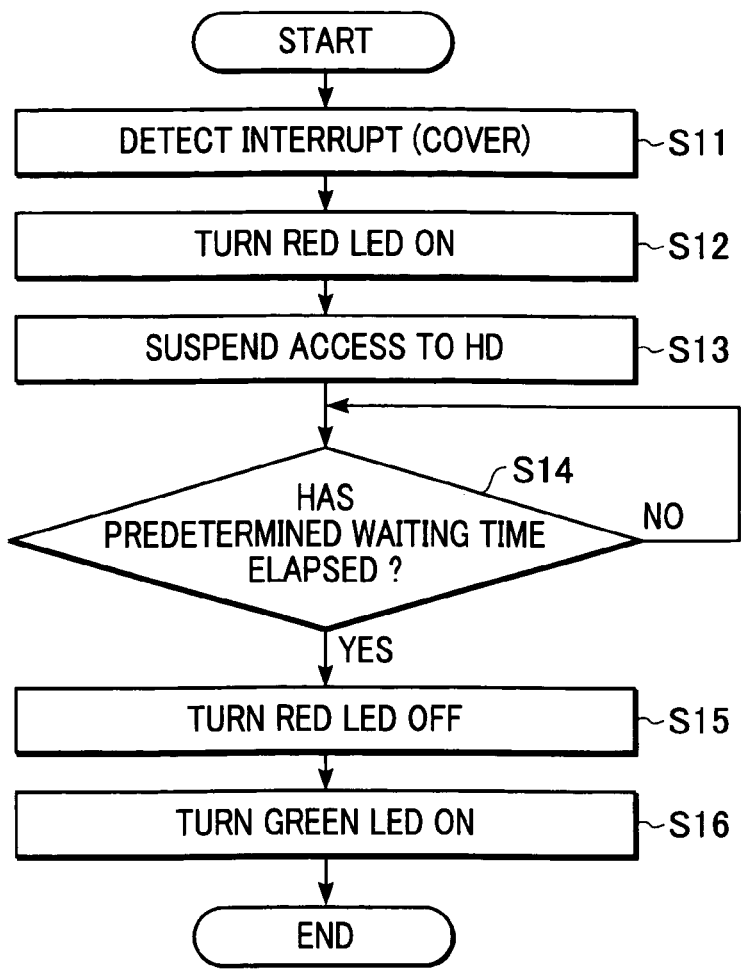
FIG. 7A is a flowchart of the operation of the system according to the first embodiment and FIG. 7B shows the structure of the system during the operation thereof.

In response to the detection signal DS of the cover 501, the CPU 2001 suspends data transfer to the HDD 2004 as illustrated in FIG. 7A, below. FIG. 7A is a flowchart of an algorithm to suspend data transfer to the HDD 2004 and control the LEDs.

When an interrupt is caused by the detection signal DS regarding the cover 501 (step S11), a red LED 401a is turned on (step S12). The red LED 401a indicates that the user is not permitted to turn the main power supply switch 401 off.

Figure 7B:
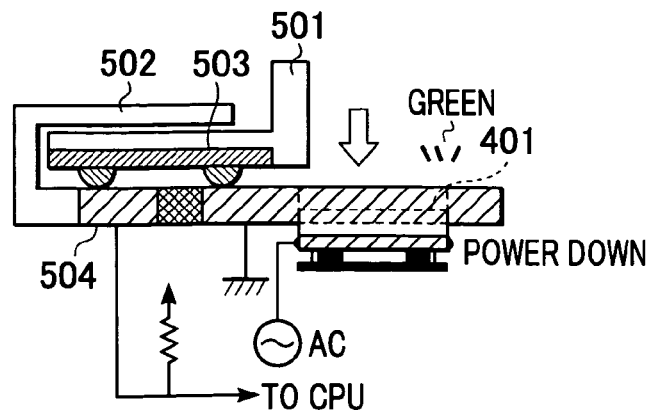

The CPU 2001 suspends access to the HDD 2004 in order to prevent writing new data to the buffer of the HDD 2004 (step S13). After a predetermined waiting time is elapsed (step S14), the red LED 401a is turned off (step S15). Then, a green LED 401b is turned on (step S16). The user recognizes the change in color of the LED from red to green and then turns the main power supply switch 401 off as shown in FIG. 7B. Consequently, cutting off the main power supply can be prevented during data write access to the hard disk medium. After the main power supply switch 401 is pressed once, the pressed state of the main power supply switch 401 is continuously held by the spring controller 507.

A method for determining the above-mentioned predetermined waiting time will now be described in detail herein below.

Figure 8A:
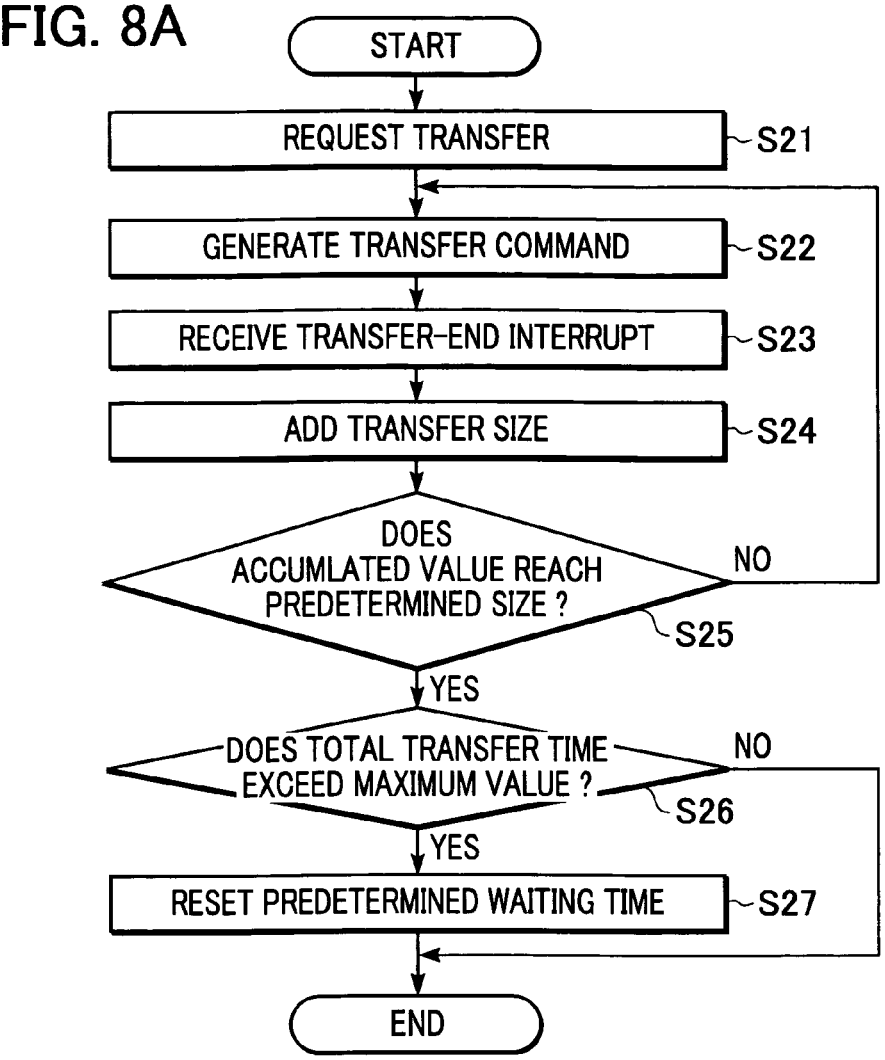
FIG. 8A is a flowchart of another operation according to the first embodiment and FIG. 8B is a diagram of the operation thereof.

FIG. 8A is a flowchart of an algorithm to set the waiting time in step S14 of FIG. 7A.

When a transfer request is generated after the start of the operation for transferring data to the HDD 2004 (step S21), the CPU 2001 generates a transfer command to the HDD 2004 (step S22), after which DMA (direct memory access) transfer to the HDD 2004 is performed. After a set size of data is transferred, a transfer-end interrupt is received (step S23).

The CPU 2001 adds the set size of transferred data to an accumulated value each time the CPU 2001 receives a transfer-end interrupt (step S24). If the accumulated value does not reach a buffer size in the hard disk medium (step S25), the process is returned to step S22. A transfer command is successively generated to continuously perform DMA transfer to the HDD 2004. A transfer-end interrupt is received. The size of transferred data is then added to the accumulated value.

When the accumulated value reaches the buffer size in the hard disk medium (step S25), the total transfer time is calculated. If the total transfer time exceeds the maximum value obtained so far (step S26), the predetermined waiting time is reset (step S27). If the total transfer time does not exceed the maximum value in step S26, the set value is held.

As mentioned above, the waiting time is determined from the longest time needed to write all data from the buffer to the hard disk medium of the HDD 2004. The waiting time begins after reception of the interrupt caused by the detection signal DS indicating that the cover 501 has been slid. Accordingly, when this predetermined waiting time has elapsed, data writing from the buffer to the hard disk medium of the HDD 2004 is completed. Thus, in this manner, damage to the hard disk medium can be prevented by the present invention by having the user turn the main power supply switch 401 off after the green LED 401b is turned on.

Figure 8B:
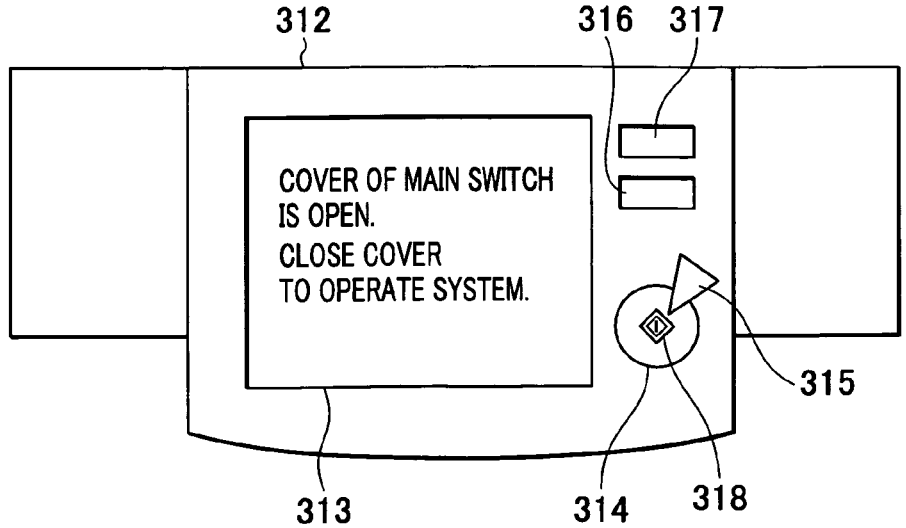

Before power is supplied, the main power supply switch 401 is again turned off. Thus, as shown in FIG. 6A, the main power supply switch 401 is returned to the original state by the action of the spring controller 507. Consequently, power can be supplied. At this time, while the cover 501 is open, the CPU 2001 receives an interrupt according to the above-mentioned configuration. Access to the HDD 2004 is suspended. The user must close the cover 501 to start access to the HDD 2004. As shown in FIG. 8B, it is necessary to display information in the display 313 of the UI 312 to indicate to the user that the main switch cover is open.

According to the present embodiment, in the multifunction device having the HDD, the detecting means (the cover 501 of the main power supply switch 401) detects that the cover 501 is open, which indicates that the user desires to cut off the main power supply. Note that provision of an indication before the user actually cuts off power supply is an advantage of the present invention as this results in simpler and inexpensive circuitry. After the cover 501 is detected as being open, the red LED 401a is turned on in order to notify the user that the turn-off of the power supply is not permitted. Herein lies another advantage of providing an indication before the user actually cuts off the power supply. Here the user can visually see the red LED to indicate that power cannot be cut off unlike the related art where there is no indication and the user is simply waiting for an undetermined amount of time until power supply cut off actually occurs. Furthermore, this is a preventive approach to avoid the user from turning off the power supply in the first place unlike the related art where a band aid approach is used to correct problems after the power supply switch is turned off. After the red LED 401a is turned on, data writing to the hard disk medium is suspended. After a predetermined time, sufficient to finish writing data to the hard disk medium has elapsed, the green LED 401b is turned on to notify the user that the main power supply can be cut off. The predetermined time is determined from the result of automatic measurement of transfer time, namely, the longest time needed to transfer data of the capacity of the buffer in the HDD 2004.

As mentioned above, an advantage of the hard disk protection means according to the present embodiment is that sector failure caused by cutting off power supply during data writing to the hard disk medium can be prevented.

According to the present embodiment, the red LED 401a indicates that the cutoff of power supply is not permitted and the green LED 401b notifies the user that the main power supply can be cut off. The present invention is not limited to the above conditions. Audible designations such as a speaker, beep and the like can be used instead of the LEDs to draw the user's attention. For example, a message saying that the user is not permitted to cut off the power supply is generated when the red LED 401a is turned on. A message saying that the power supply can be cut off is generated when the green LED 401b is turned on. Alternatively, the LCD 313 can display information similar to the messages.

According to the present embodiment, the predetermined time needed to write data from the buffer to the hard disk of the HDD 2004 is determined from the result of automatic measurement of the longest time required to transfer data of the capacity of the buffer in the HDD 2004. The present invention is not limited to the case. Sufficient time for a normal transfer can also be employed.

Second Embodiment

A multifunction device according to a second embodiment of the present invention will now be described. The second embodiment differs from the first embodiment with respect to the configuration of hard disk protecting means. In the following description, the same components are designated by the same reference numerals.

Hard Disk Protecting Means

The hard disk protecting means according to the second embodiment of the present invention will now be described hereinbelow.

Figure 9:
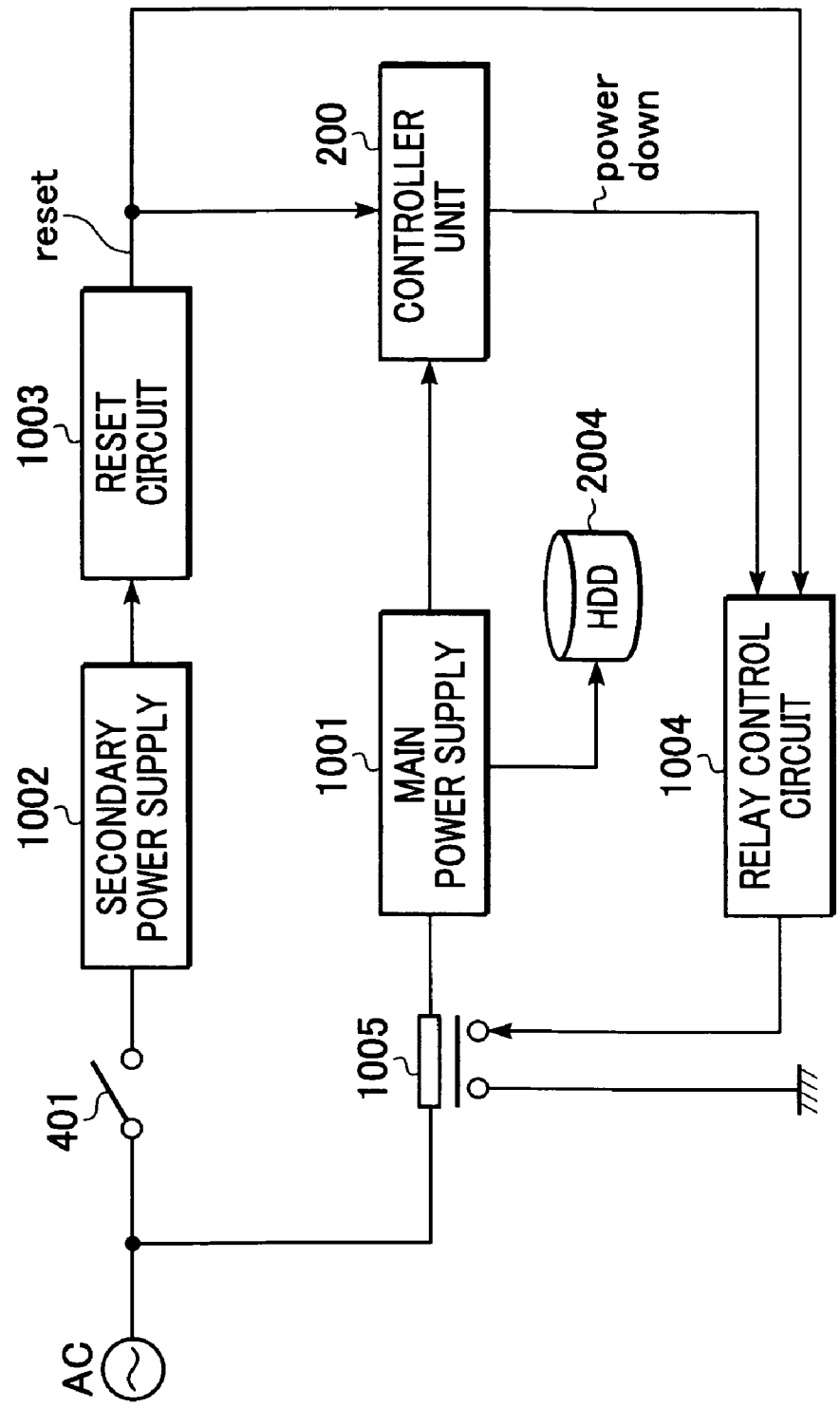
FIG. 9 is a block diagram of a power supply control system of a multifunction device according to a second embodiment of the present invention.

FIG. 9 is a block diagram of a power supply control system of the multifunction device according to the second embodiment of the present invention.

The power supply control system includes a main power supply 1001, a secondary power supply 1002, a reset circuit 1003, a relay control circuit 1004, a relay 1005, and a main power supply switch 401.

The main power supply 1001 supplies power to a controller unit 200 and an HDD 2004 and converts AC into DC. The main power supply (AC power supply) 1001 supplies most of the power required for the present device. The operation of the secondary power supply 1002 depends on the ON/OFF state of the main power supply switch 401. The secondary power supply 1002 is used to allow the reset circuit 1003 to generate a signal for controlling AC power supply to the main power supply 1001. The capacity of the secondary power supply 1002 is smaller than that of the main power supply 1001.

Figure 10A:
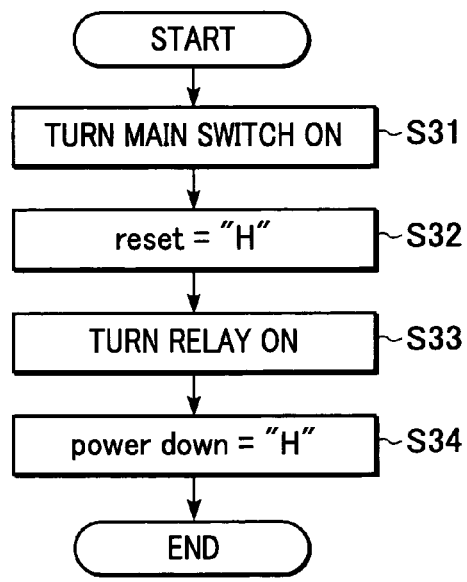
FIGS. 10A and 10B are flowcharts of the operations according to the second embodiment.

FIG. 10A is a flowchart of a power supply control when the main power supply switch 401 is turned on.

When the main power supply switch 401 is turned on (step S31), AC power is supplied to the secondary power supply 1002. The secondary power supply 1002 converts AC into DC and supplies DC power to the reset circuit 1003. The reset circuit 1003 generates a reset signal at a level "H" (high) (step S32).

In response to the reset signal at the level "H", the relay control circuit 1004 turns the relay 1005 on (step S33). AC power is supplied to the main power supply 1001, so that power is supplied to the controller unit 200 and the HDD 2004.

When power is supplied to the controller unit 200, a power-down signal serving as an output signal of the controller unit 200 is deasserted to the level "H" (step S34). So long as either the reset signal or the power-down signal is in the level "H", the relay control circuit 1004 continuously turns the relay 1005 on.

Figure 10B:
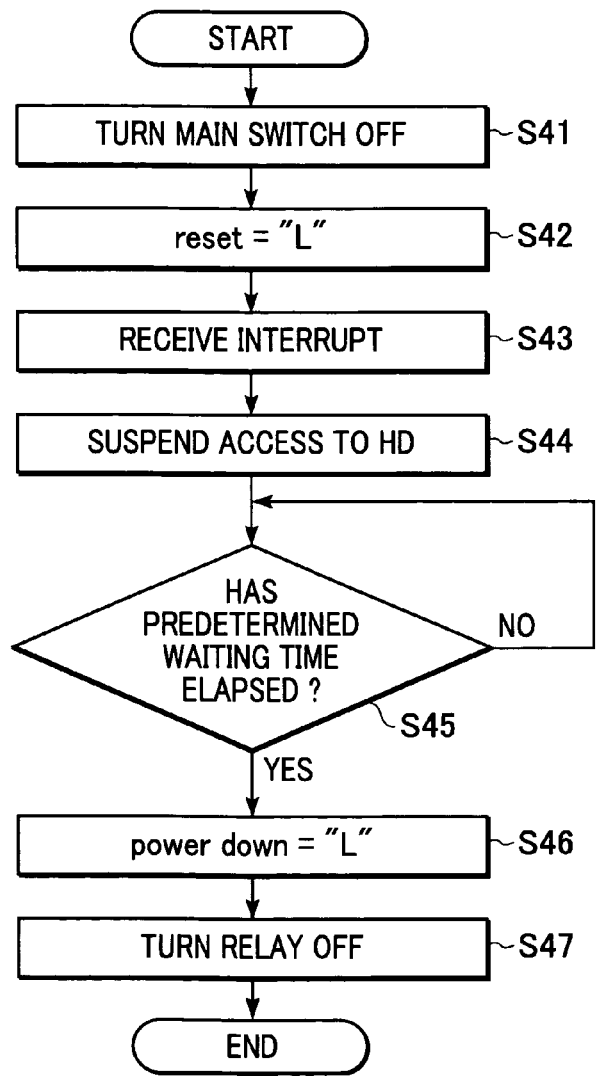

FIG. 10B is a flowchart of a power supply control performed when the main power supply switch 401 is turned off.

When the main power supply switch 401 is turned off (step S41), the AC power supplied to the secondary power supply 1002 is cut off, thus cutting off the DC power. The reset circuit 1003 detects the DC power cutoff and then generates a reset signal at a level "L" (low) (step S42). The reset output of the reset circuit 1003 also serves as an interrupt signal to the CPU 2001 in the controller unit 200. Accordingly, the CPU 2001 in the controller unit 200 can detect the timing of generation of the reset output of the reset circuit 1003.

In response to the interrupt signal, the CPU 2001 first suspends access to the HDD 2004 so that new data is not written to the buffer of the HDD 2004 (step S44). Generally, the hard disk includes a buffer and a medium. After access is suspended, data stored in the hard disk buffer is continuously written to the medium. Since the capacity of the buffer is increasing, time elapsed after suspension of access until data transfer to the medium is completed cannot be simply ignored. The time (predetermined) is tracked using the routine described in step S45. The above-mentioned power-down signal is generated at the level "L" (step S46). Consequently, both the power-down signal and the reset signal in the relay control circuit 1004 are in the level "L", the relay control circuit 1004 turns the relay 1005 off (step S47).

When the relay 1005 is turned off, AC power is not supplied to the main power supply 1001 and power supply to the controller unit 200 and the HDD 2004 is cut off, so that the system halts. As mentioned above, after non-writing mode in the HDD 2004 is confirmed, power supply is cut off. Thus, the risk of starting failure associated with the occurrence of sector failure in the HDD 2004 can be reduced.

The method for determining the predetermined time in step S45 is similar to that described in the first embodiment with reference to FIG. 8A. The predetermined waiting time determined as mentioned above is based on the longest time required to write all data in the buffer of the hard disk to the media. Therefore, after the predetermined waiting time elapsed after the interrupt generated at the turn-off of the main power supply switch 401 is received, writing the data in the buffer of the hard disk is completed. When the relay 1005 is turned off, the writing operation in the HDD 2004 is completed. Thus, any risk of data loss or device damage associated with power cutoff can be prevented.

A program according to the flowcharts of FIGS. 7A, 8A, 10A, and 10B is stored in, for example, the ROM 2003 of the controller unit 200 and is operated, so that the above-mentioned control method can be implemented.

The present invention is not limited to the above-disclosed embodiments. The present invention can be applied to a multiple device system or a single device system. The present invention can also be applied to a printer, a scanner, and a facsimile. The advantage of the present invention can be accomplished by providing a storage medium, which contains program code for the CPU 2001 for implementing functions described in the above embodiments, to a system or a device, reading the program code from the storage medium through a computer such as a CPU or an MPU of the system or device, and then executing the program code to realize the functions. In the above embodiments, protecting the hard disk has been described. Even if power supply is cut off during data writing to a recording medium, sector failure can be prevented to avoid start up problems during power up. The present invention can also be applied to other media such as a floppy disk, a hard disk, an optical disk, a magneto-optical disk, a CD-ROM, a CD-R, a magnetic tape, a nonvolatile memory card, and a ROM.

In this case, the program code, read from the storage medium, implements the functions according to the above embodiments. The present invention includes the storage medium containing the program code. The storage medium such as a floppy disk, a hard disk, an optical disk, a magneto-optical disk, a CD-ROM, a CD-R, a magnetic tape, a non-volatile memory card, or a ROM can be used for providing the program code. In addition to the case where the program code read through the computer is executed to realize the functions according to the above-mentioned embodiments, the present invention further includes a case where an operating system (OS), running on the computer, performs a part or an entire actual process in accordance with instructions of the program code to implement the functions according to the above embodiments.

Furthermore, the present invention includes a case where program code read from the storage medium is written into a function expansion board inserted in the computer or a memory included in a function expansion unit connected to the computer, and expansion is performed through a CPU included in the function expansion board or unit in accordance with instructions of the program code to execute a part or an entire actual process, thus realizing the functions according to the above embodiments.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A storage device having a hard disk for storing data, the hard disk including a disk medium and buffer means for writing data to the disk medium, the storage device comprising:
   power supply means for supplying power to the storage device;
   detecting means for detecting an operation to cut off a power supply from the power supply means to the storage device;
   access suspending means for suspending access to the hard disk when the detecting means detects the operation;
   medium writing means for performing a writing process for writing data stored in the buffer means to the disk medium when the detecting means detects the operation;
   power cutoff means for cutting off the power supply when the writing process has already been performed by the medium writing means; and
   setting means for setting a waiting time required for the writing process,
   wherein the power cutoff means cuts off the power supply after the waiting time set by the setting means has elapsed after the detection of the operation by the detecting means.

2. The device according to claim 1, further comprising:
   a relay for generating an ON signal to connect the power supply means to the storage device and generating an OFF signal to disconnect the power supply means from the storage device in response to a control signal,
   wherein the power supply is cut off by the OFF signal generated by the relay, the OFF signal being generated based on the control signal generated after the elapse of the waiting time.

3. A hard disk protecting method for a storage device having a hard disk for storing data, the hard disk having a disk medium and buffer means for writing data to the disk medium, the method comprising the steps of:
   detecting an operation to cut off a power supply from a power supply means to the storage device;
   suspending access to the hard disk when the operation is detected in the detecting step;
   performing a writing process for writing data stored in the buffer means to the disk medium when the operation is detected in the detecting step;
   cutting off the power supply when the writing process has already been performed; and
   setting a waiting time required for the writing process,
   wherein the power supply is cut off after the waiting time has elapsed after the detection of the operation.

4. A hard disk protecting method for a storage device having a hard disk for storing data, the hard disk having a disk medium and buffer means for writing data to the disk medium, the method comprising:
   detecting a user action to cut off power supply from a power supplying means to the storage device;
   suspending access to the hard disk when the user action is detected;
   performing a writing process for writing data stored in the buffer means to the disk medium when the user action is detected;
   cutting off the power supply to the storage device when an operation to cut off the power supply is performed by a user, the operation being performed after a detection of the user action;
   notifying that the operation is not permitted in a case where the writing process has not been performed and notifying that the operation is permitted in a case where the writing process has already been performed; and
   setting a waiting time required for the writing process,
   wherein a notification that the operation is not permitted is notified when the waiting time has not elapsed after the detection of the user action and a notification that the operation is permitted is notified when the waiting time has elapsed after the detection of the user action.

5. The device according to claim 1, wherein the setting means sets the waiting time based on a buffer size of the buffer means.

6. The method according to claim 3, wherein the waiting time is set based on a buffer size of the buffer means.

7. The method according to claim 4, wherein the waiting time is set based on a buffer size of the buffer means.

8. A storage device having a hard disk for storing data, the hard disk including a disk medium and buffer means for writing data to the disk medium, the storage device comprising:
   power supply means for supplying power to the storage device;
   detecting means for detecting a user action to cut off a power supply from the power supply means to the storage device;
   access suspending means for suspending access to the hard disk when the detecting means detects the user action;

medium writing means for performing a writing process for writing data stored in the buffer means to the disk medium when the detecting means detects the user action;

power cutoff means for cutting off the power supply to the storage device when an operation to cut off the power supply is performed by a user, the operation being performed after a detection of the user action; and notifying means for notifying that the operation to cut off the power supply is not permitted in a case where the writing process has not been performed by the medium writing means and notifying that the operation is permitted in a case where the writing process has already been performed by the medium writing means, wherein said notifying means notifies whether the operation to cut off the power supply is permitted or not using an LED (Light Emitting Diode).

9. A storage device having a hard disk for storing data, the hard disk including a disk medium and buffer means for writing data to the disk medium, the storage device comprising:

power supply means for supplying power to the storage device;

detecting means for detecting a user action to cut off a power supply from the power supply means to the storage device;

access suspending means for suspending access to the hard disk when the detecting means detects the user action;

medium writing means for performing a writing process for writing data stored in the buffer means to the disk medium when the detecting means detects the user action;

power cutoff means for cutting off the power supply to the storage device when an operation to cut off the power supply is performed by a user, the operation being performed after a detection of the user action; and notifying means for notifying that the operation to cut off the power supply is not permitted in a case where the writing process has not been performed by the medium writing means and notifying that the operation is permitted in a case where the writing process has already been performed by the medium writing means, wherein said notifying means notifies whether the operation to cut off the power supply is permitted or not by using a speaker.

10. A storage device having a hard disk for storing data, the hard disk including a disk medium and buffer means for writing data to the disk medium, the storage device comprising:

power supply means for supplying power to the storage device;

detecting means for detecting a user action to cut off a power supply from the power supply means to the storage device;

access suspending means for suspending access to the hard disk when the detecting means detects the user action;

medium writing means for performing a writing process for writing data stored in the buffer means to the disk medium when the detecting means detects the user action;

power cutoff means for cutting off the power supply to the storage device when an operation to cut off the power supply is performed by a user, the operation being performed after a detection of the user action;

notifying means for notifying that the operation to cut off the power supply is not permitted in a case where the writing process has not been performed by the medium writing means and notifying that the operation is permitted in a case where the writing process has already been performed by the medium writing means; and setting means for setting a waiting time required for the writing process, wherein the notifying means notifies that the operation is not permitted when the waiting time has not elapsed after a detection of the user action and notifies that the operation is permitted when the waiting time has elapsed after the detection of the user action.

11. The device according to claim 10, wherein the setting means sets the waiting time based on a buffer size of the buffer means.

12. A storage device having a hard disk for storing data, the hard disk including a disk medium and buffer means for writing data to the disk medium, the storage device comprising:

power supply means for supplying power to the storage device;

detecting means for detecting a user action to cut off a power supply from the power supply means to the storage device;

access suspending means for suspending access to the hard disk when the detecting means detects the user action;

medium writing means for performing a writing process for writing data stored in the buffer means to the disk medium when the detecting means detects the user action;

power cutoff means for cutting off the power supply to the storage device when an operation to cut off the power supply is performed by a user, the operation being performed after a detection of the user action; and notifying means for notifying that the operation to cut off the power supply is not permitted in a case where the writing process has not been performed by the medium writing means and notifying that the operation is permitted in a case where the writing process has already been performed by the medium writing means, wherein the detecting means detects the user action in a case where a cover to prevent the operation to cut off the power supply is moved from a predetermined position.

* * * * *